Sept. 1, 1959

L. D. P. KING 2,902,424

HOMOGENEOUS NUCLEAR POWER REACTOR

Filed June 6, 1956

WITNESSES:

INVENTOR.
L.D.P. King
BY

Sept. 1, 1959 L. D. P. KING 2,902,424
HOMOGENEOUS NUCLEAR POWER REACTOR
Filed June 6, 1956 8 Sheets-Sheet 2

Fig. 2

WITNESSES:

INVENTOR.
L. D. P. King
BY

Sept. 1, 1959        L. D. P. KING        2,902,424

HOMOGENEOUS NUCLEAR POWER REACTOR

Filed June 6, 1956        8 Sheets-Sheet 3

WITNESSES:

INVENTOR.
L.D.P. King
BY

Sept. 1, 1959 L. D. P. KING 2,902,424
HOMOGENEOUS NUCLEAR POWER REACTOR
Filed June 6, 1956 8 Sheets-Sheet 5

WITNESSES:
Ralph Corlis Smith
A. Fredrick Samann

INVENTOR.
L.D.P. King
BY
Roland A. Anderson
A. Harvey

Sept. 1, 1959     L. D. P. KING     2,902,424
HOMOGENEOUS NUCLEAR POWER REACTOR
Filed June 6, 1956     8 Sheets-Sheet 7

WITNESSES:

INVENTOR.
L. D. P. King
BY

Sept. 1, 1959          L. D. P. KING          2,902,424
HOMOGENEOUS NUCLEAR POWER REACTOR
Filed June 6, 1956          8 Sheets—Sheet 8

WITNESSES:         INVENTOR.
L.D.P. King
BY

2,902,424
HOMOGENEOUS NUCLEAR POWER REACTOR

L. D. P. King, Los Alamos, N. Mex., assignor to the United States of America as represented by the United States Atomic Energy Commission Application June 6, 1956, Serial No. 589,837

1 Claim. (Cl. 204—193.2)

The present invention relates to nuclear reactors and more particularly to homogeneous nuclear power reactors utilizing a liquid fuel.

The nuclear reactor of the present invention is an improved reactor of the homogeneous type, and is described as particularly suitable for use in power generating facilities.

Homogeneous reactors of the prior art generally require extensive fuel handling and gas recombining systems. Thus, in reactor systems utilizing uranium water solutions the radiolytic dissociation of the water creates an explosive mixture of hydrogen and oxygen which must either be vented or recombined. In either case extensive apparatus is required for the safe handling of these gases. Further, such aqueous systems are generally convection circulated thereby limiting the power level. The prior art homogeneous reactors also generally have wide ranges in operating temperature which produce large undesirable reactivity effects. However, the use of homogeneous reactors for power production has well known advantages, i.e., inherently safe operation because of the negative temperature coefficient of reactivity, and the comparative ease in recovering the fissionable material and products thereof from the liquid fuel.

The preferred embodiment of the present invention does not require fuel handling outside of the reactor vessel during any normal operation including complete shutdown to room temperature, nor is radiolytic gas handling or recombining apparatus required. The preferred embodiment of the present invention utilizes a liquid fuel comprising a uranium, phosphoric acid and water solution which requires no gas exhaust system or independent gas recombining system. The inherent power limitations of the prior art homogeneous reactors are overcome in the present invention by utilizing forced circulation of the liquid fuel.

The present invention was designed in accordance with the following considerations: (a) a minimum active volume to permit the construction of a high-pressure high-temperature reactor of reasonable size, (b) a small excess reactivity, and (c) good self-regulating features under extreme operating conditions. These initial conditions imply a minimum of absorbing material in the critical region, high neutron reflection, and a maximum of self-regulation.

Although the description of the preferred embodiment is specific to a power-level of about 2 megawatts, at which the thermal neutron flux would be of the order of $10^{13}$ neutrons/cm$^2$/sec. using ordinary water as moderator, appropriate changes in the size of the critical region, heat exchanging capacity and volume of fuel may be made to provide a power output of either larger or smaller value.

The reacter of the present invention consists generally of a reactor vessel having four main regions, i.e., a liquid fuel reservoir, a heat exchanger region, a critical region and a vapor region. These are of the proper size to take care of large temperature and accompanying reactivity change by means of a suitable geometry change. The critical region is located between the two non-critical regions, i.e., a poor geometry vapor region above, and a heat exchanger region below. The amount of solution in the critical region depends on the liquid fuel temperature, and is full only at the desired operating temperature.

The preferred embodiment of the present invention provides for the circulation of liquid fuel by means of an impeller which moves the liquid fuel through the heat exchanger. The location of the heat exchanger outside of the critical region but within the reactor vessel reduces the size of the critical region and minimizes the liquid fuel circulating circuit.

Further, by this arrangement and association of components within the reactor vessel the liquid-gas interface under normal operating conditions is not within the critical region, i.e., not within the geometry which determines the critical mass, as it will be located above the baffle which defines the upper limit of the critical region. Therefore, disturbances on the liquid surface will have a reduced effect upon the power and neutron level.

A cold critical volume of fuel, as described in more detail hereinafter, is introduced into the reactor and fills the fuel reservoir and partially fills the critical region. The capacities of the reservoir region and the critical region are such that upon expansion of the selected fuel solution at the elevated operating temperature the solution will completely fill the critical region, thereby creating a critical assembly. The critical region will not have a large excess $k$, since it can never be full of cold solution. The expansion of the liquid fuel in the reservoir region when the temperature is raised forces additional fuel into the critical region. This gain in criticality is partially compensated for by the negative temperature coefficient of the solution in the critical region when a cylindrical shape is used. Complete compensation would be possible by properly shaping the critical region. When the critical region is almost full, a slight gain in reactivity will be produced by additional neutron reflection from the baffle separating the vapor and critical regions. Any additional rise of the liquid fuel into the vapor region above the baffle will have little effect on reactivity.

Thus it is apparent that in the reactor of the present invention a predetermined relation exists between the ratio of cold critical fuel volume and total reactor volume, and hot critical fuel volume and total reactor volume. These ratios, as explained in more detail hereinafter, require that the volume of liquid fuel initially put into the reactor bear a certain relation to the volume of the entire reactor vessel, this relation being dependent upon the expansion coefficient of the liquid fuel.

Therefore it is an object of the present invention to provide a homogeneous, liquid fuel reactor which is controlled by the thermal expansion of the liquid fuel utilized.

Another object of the present invention is to provide such a nuclear reactor which does not require gas recombining apparatus or liquid fuel handling outside of the reactor vessel during normal operation.

A further object of the present invention is to provide such a nuclear reactor having a minimum critical volume, small excess reactivity, and good self-regulating features.

A still further object of the present invention is to provide such a nuclear reactor which is so designed and constructed that the expension of the solution at the elevated operating temperature fills the reactor critical region and makes it slightly super-critical.

A still further object of the present invention is to provide a reactor which can be completely shut down without removing the liquid fuel from the reactor vessel and which does not have the critical region full of cold solution during shutdown.

Other objects and advantages of the present invention will become more apparent from the following description including the drawings, hereby made a part of the specification, wherein.

SUMMARY OF REACTOR SPECIFICATIONS

| | |
|---|---|
| Type | Homogeneous. |
| Neutron energy | Thermal. |
| Power | 2 megawatts. |
| Fuel | About 90 percent enriched $UO_3$ dissolved in $H_3PO_4$. |
| Moderator | Water (ordinary). |
| Solution: | |
|   Composition | .6 M $UO_3$+7.5 M $H_3PO_4$. |
|   Power density | 46.5 kw./liter. |
|   Specific power | 470 kw./kg. fissionable material. |
|   Critical mass | 4.24 kg. |
|   Total fissionable material | 9.2 kg. |
|   Hot volume | 94 liters (430° C.). |
|   Cold volume | 62 liters (20° C.). |
|   Maximum operating temperature | 455° C. (850° F.). |
|   Maximum operating pressure | 5000 p.s.i. |
|   Gas evolution | Equal to recombination by back reaction. |
| Heat exchanger: | |
|   Area | 38.5 sq. ft. |
|   Average heat flux | 177,000 B.t.u./sq. ft./hr. |
|   Coolant | Water. |
|   Coolant velocity | Inlet 15 ft./sec. at 3900 p.s.i.; outlet 120 ft./sec. at 3600 p.s.i. |
|   Coolant flow rate | 12 g.p.m. |
|   Coolant temperature | In 38° C.; out 427° C. |
| Vessel: | |
|   Over-all volume (less pump) | 122 liters. |
|   Vapor volume | 26.88 liters. |
|   Storage volume and heat exchanger region | 48.39. |
|   Critical region | 15" dia. x 16" high cylinder, with a volume of 46.21 liters. |
|   Over-all vessel length | 8.25 ft. |
|   Vessel and pump | 12.63 ft. |
|   Composition | 3" wall stainless steel. |
| Control: Rods ($B^{10}$ density 1.7) | 4 safety. 1 control. |
| Shield: Composition | 4 ft. $H_2O$+10" Pb+5.5 ft. concrete. |
| Fluxes in core: | |
|   Fast neutrons (maximum, over .038 e.v.) | $1.4 \times 10^{14}$ n./cm.²/sec. |
|   Fast neutrons (average) | $9 \times 10^{13}$ n./cm.²/sec. |
|   Fast neutrons (inner vessel surface) | $7 \times 10^{13}$ n./cm.²/sec. |
|   Thermal neutrons (maximum) | $2.6 \times 10^{13}$ n./cm.²/sec. |
|   Thermal neutrons (average) | $1.3 \times 10^{13}$ n./cm.²/sec. |
|   Total gamma flux | $7 \times 10^{17}$ γ/sec. |

APPARATUS

Figure 1:
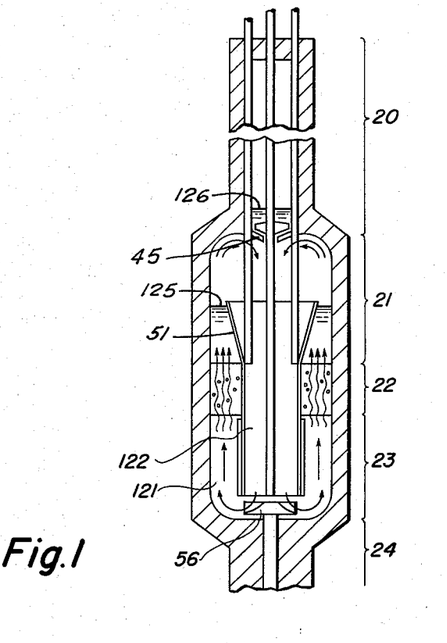
Figure 1 is a functional diagram of the preferred embodiment of the reactor of the present invention helpful in explaining the operation of the reactor.

The preferred embodiment of the present invention is shown in schematic form in Figure 1, and may be divided into five regions for the purpose of description, i.e., vapor region and manifold section 20, critical region 21, heat exchanger region 22, fuel reservoir 23, and circulating apparatus section 24. These sections are shown in detail in Figure 2 of the accompanying drawing. Referring now to the detailed sectional view of Figure 2, the preferred embodiment of the reactor of the present invention consists of a pressure vessel 25, preferably fabricated from stainless steel and plated with gold, which has an upper flange 26 and a reduced diameter impeller section 27. The interior of the vessel has a diacritical diameter section 28, a non-critical reduced diameter section 29, having a diameter less than the diameter of the diacritical diameter and which extends from the top of the heat exchanger region 22 to the bottom of the fuel reservoir 23, and a circulating pump aperture 30 at its lower extremity.

Figure 2:
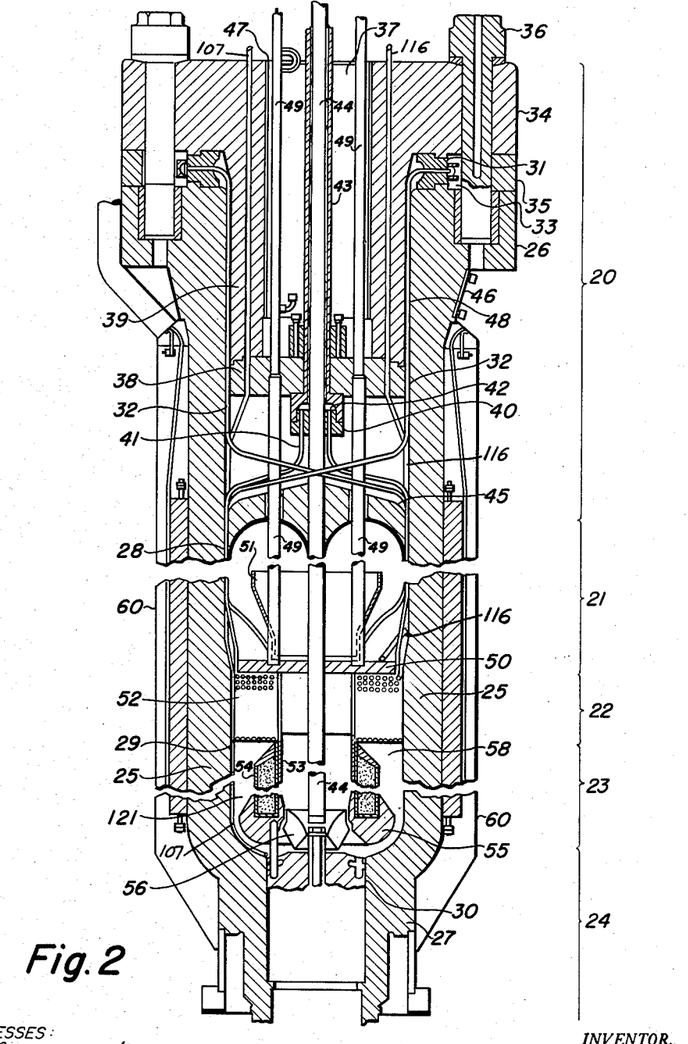
Figure 2 is a detailed sectional view of the preferred embodiment of the reactor of the present invention.

Attached and sealed to the upper vessel flange 26 is a coolant inlet manifold assembly 31. Connected to the inlet manifold assembly 31 is a plurality of heat exchanger lead pipes 32 which are sealed to the manifold 31 and which are connected to a source of water (not shown) through inlet water channel 33. A top plate assembly 34, is sealed to the inlet water manifold assembly 31, and to a spacer ring 35, by means of a plurality of bolts 36 or other well-known means. The top plate assembly 34 has a cross section in the form of a T with a central aperture 37 and bottom plate 38 welded or otherwise sealed to lower portion 39 of the top plate assembly 34.

Fixed to the interior surface of bottom plate 38 and extending upwardly therethrough and through central aperture 37 is steam outlet manifold assembly 40. Terminating in the outlet manifold 40 are outlet lead pipes 41 of heat exchanger 52 which are sealed to the outlet manifold 40 and are connected to the steam utilizing systems (not shown) through outlet channel 42. The outlet channel 42 extends up through sleeve 43 which is connected in any conventional manner to the steam system. Supported within the sleeve 43 is a central control rod thimble 44 which is of considerably smaller outside diameter than the inside diameter of sleeve 43 and has its upper extremity welded to the inside surface of the sleeve 43 to provide a seal for the channel 42. The channel 42 is connected to the steam utilizing system through an aperture in the upper portion of sleeve 43. Control rod thimble 44 extends downwardly through sleeve 43, is welded or otherwise sealed to outlet manifold assembly 40, and extends to the bottom of fuel reservoir 23.

The outlet and inlet manifold assemblies, as described above, are separated by a distance of about 18 inches in the preferred embodiment so that gradual temperature gradients are possible, and so that the thermal stresses in the top plate assembly 34 and vessel flange 26 are reduced. It should also be noted that the main vessel seal through inlet manifold assembly 31 and spacer ring 35 is well above the critical region 21. The flange 26 may be water cooled by cooling jacket 46, as is the surface of the central apertures 37 by cooling jacket 47. The main vessel seal region is further cooled by the inlet manifold 31. In this manner, the activation of the seal region, which should not exceed a temperature of 50° C., will be low, with about 18 inches of steel available to attenuate neutrons and gamma rays. Seal welds are provided although with the low temperatures existing in this region neoprene or metal O rings or similar sealing means may be used. Channel 48 between the vessel 25 and the lower portion 39 of the top plate assembly 34 serves the dual purpose of separating the hot and cold manifolds and of providing a restricted region where vapor condensation may take place.

Additional or fewer safety rod thimbles 49 may be provided. In the preferred embodiment these thimbles 49 are four in number, are symmetrically placed around the central control rod thimble 44, and extend only to the bottom of the critical region 21. Thimbles 49 are sealed to the bottom plate 38 and extend upwardly through the central aperture 37.

Supported by the central control rod thimble 44 is a liquid fuel flow directing baffle 45. The baffle is made heavy to decrease gamma ray heating of the cover, to serve as a poison for the vapor region, and to provide a narrow region above which the liquid fuel can rise without producing a change in criticality due to a volume change of the reactor core.

The central thimble 44 also supports a spider 50 which is attached to the bottom of thimbles 49. In this manner the upward thrust caused by the circulating liquid is distributed over all of the thimbles. The spider 50 is made up of several diametric supports which support a platinum funnel 51, heat exchanger 52, draft tube 53 and poison reservoir 54.

The patinum funnel 51 serves to guide the liquid fuel against the baffle 45 and to prevent vortexing of the liquid entering the draft tube 53. The funnel 51 is provided with openings (not shown) to permit convection currents in the vessel during start-up and before the circulating pump is turned on.

The heat exchanger 52 consists of twenty-two similarly shaped, tightly wound spirals which are closely spaced, e.g., $\frac{1}{16}$ inch and staggered for maximum efficiency. The coils are made of $\frac{3}{16}$ inch O.D., $\frac{1}{8}$ inch I.D., stainless steel tubing which is clad with a few mils of gold. The heat exchanger is supported by inlet pipes 32 and outlet pipes 41. However, the spider 50 provides support against upward movement resulting from the forced circulation of the liquid fuel.

The draft tube 53 extends downwardly from the spider 50 through the heat exchanger 52 to the bottom of the fuel reservoir 23. Attached to the draft tube 53 is a poison reservoir or can 54 which contains highly compressed and sintered normal boron carbide, or other neutron absorbing material, the purpose of which will be apparent hereinafter. Attached to the lower extremity of draft tube 53 is a flow directing element 55 which is shaped to give an efficient suction inlet and turn-around for the liquid fuel.

The reactor vessel 25 is surrounded by a reflector (not shown) which consists of, in the preferred embodiment, four feet of water, which also serves as a neutron shield. It should be noted however that the reflector may be of any material known in the art as a neutron reflector or the reflector may be absent if sufficient fissionable material is present.

Figure 3:
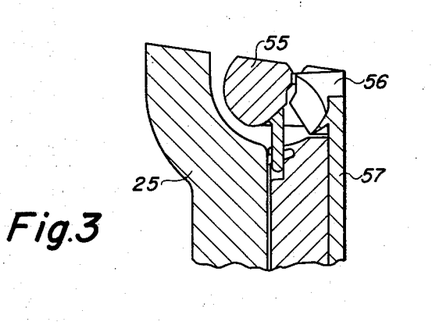
Figure 3 is a sectional view of a portion of the circulating pump utilized in the reactor of Figure 2.

Figure 3 shows a detailed cross-sectional view of a portion of the circulating pump. The pump is of commercial design and therefore no detailed description of the pump assembly is included herein. Referring to Figure 3, an impeller 56 is attached to a shaft 57. The impeller 56 is designed to draw the liquid fuel down from the draft tube 53 into the area below the flow directing element 55 and force the liquid upwardly into channel 58. The pump is inserted through pump aperture 30. The motor is of the sealed rotor construction, designed to take up to 10,000 p.s.i. pressure. The bearings are of the liquid floating type. A small integral impeller circulates a lubricant and also cools the bearings. The stator is cooled by water circulating in the tubular electrical conductors. A labyrinth type seal is provided to reduce mixing between the hot radioactive liquid fuel in the vessel and the similar low temperature liquid flowing in the pump circulation cooling system.

The critical region 21, heat exchanger region 22, and the fuel reservoir 23 of the reactor vessel 25 are surrounded by a retort jacket assembly 60. The jacket assembly contains insulation to minimize the temperature gradient between the vessel and the surrounding water shield during normal operation, and cooling coils to take care of additional gamma heating resulting from short, higher than normal power runs or errors in calculations. Electrical heaters may also be incorporated in the retort jacket assembly for initially heating the soup should this be required for start-up procedures.

LIQUID FUEL SYSTEM

Figure 4:
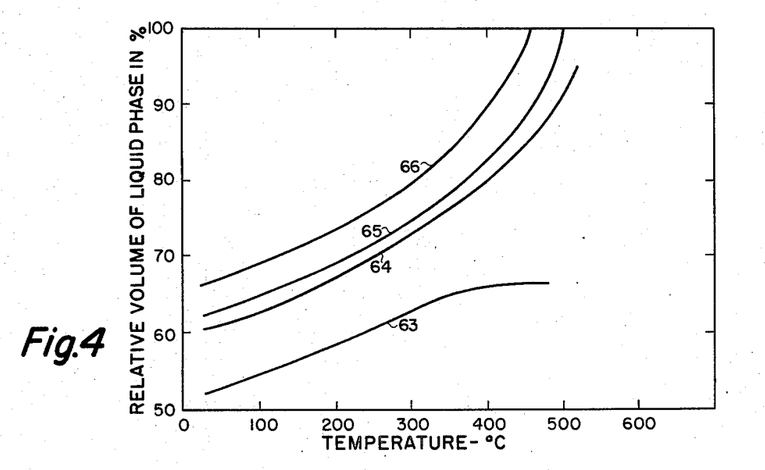
Figures 4 and 5 are graphs showing the temperature characteristics of the liquid fuel solution of the present invention.

The preferred liquid fuels for use in the present invention are solutions of enriched uranium phosphate in phosphoric acid and water, although other liquid fuels having similar characteristics may be used. The preferred solutions include uranyl phosphate and uranous phosphate in phosphoric acid and water, i.e., U(VI) and U(IV), respectively. The uranium is preferably enriched in the isotope $U^{235}$ to a value of about 90 percent, however other enrichments of $U^{235}$ or $U^{233}$, as well as $D_2O$ or mixtures of $H_2O$ and $D_2O$, may be utilized in the liquid fuels of the present invention. The accompanying drawings, Figures 4 through 12, illustrate some of the properties of these solutions. With particular reference to Figure 4, there is shown the dependence of the relative volume of the liquid phase in percent of the total volume of the vessel upon the temperature in degrees C. for the solution of 0.491 M U(VI) as $UO_3$ in 7.5 M $H_3PO_4$.

Curve 63 at an initial filling of 52 percent shows that at increasing temperatures the relative volume of the vapor phase tends to level off, i.e., the liquid does not expand sufficiently to fill the entire volume of the vessel. However, this leveling off is dependent upon initial filling.

Curve 64 at an initial filling of 60.5 percent shows that the liquid expands with increasing temperature thereby filling a greater percentage of the total volume until at a temperature of about 525° C. the meniscus disappears. This phenomenon is interpreted to mean that at the critical temperature, i.e., the point where the meniscus disappears, the uranium becomes soluble in the gas phase in the upper portion of the container formerly occupied by vapor only. This amounts to a sudden dilution of the uranium at this transition and the reactor would become subcritical. Thus for the particular solution and percent initial filling the maximum operating temperature could be built into the reactor, thereby controlling the reactor.

Curve 65 with an initial filling of 61.8 percent shows that for the particular solution the phase critical phenomenon is no longer present. Thus such a solution filling could be utilized in a reactor where it was considered undesirable to have the phase critical phenomenon present in the reactor system. A similar effect is obtained by increasing the phosphoric acid concentration as described below.

Curve 66 shows the effect of a greater initial filling on the maximum operating temperature. As can be seen by comparing curves 65 and 66, the effect of an increase in initial filling in this range of about 5.2 percent decreases the temperature at which the entire volume is occupied by the liquid phase from about 500° C. to about 450° C. In this manner the maximum desired operating temperature can be built into the reactor by varying the initial filling.

Figure 5:
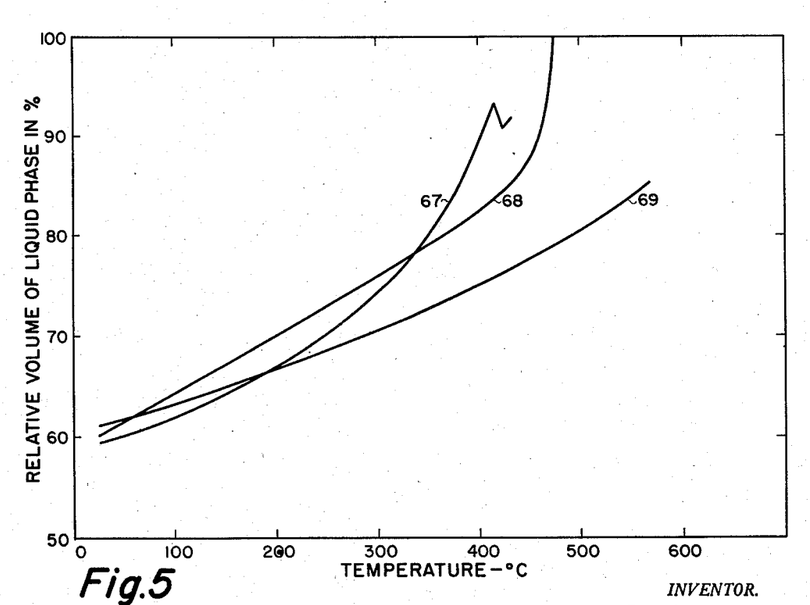

Figure 5 shows the effect of varying the concentration of phosphoric acid with approximately constant uranium concentration and initial degree of filling wherein the abscissa and ordinate are the same as Figure 4.

Curve 67, for a solution of 0.483 M U(VI) as $UO_3$ in 4.10 M $H_3PO_4$ with an initial filling of 59.3 percent which is approximately equal to the filling for curve 64 of Figure 4, shows that the effect of a decrease in the concentration of phosphoric acid for approximately the same uranium concentration results in the phase critical phenomenon becoming more pronounced, appearing at a considerably lower temperature, and having a negative slope portion. This is due principally to the lower concentration of phosphoric acid.

Curve 68, for a solution of 0.462 M U(VI) as $UO_3$ in 5.61 M $H_3PO_4$ with an initial filling of 60.1 percent may be compared with curve 66, 0.491 M U(VI) as $UO_3$ in 7.5 M $H_3PO_4$. An increase in phosphoric acid concentration, i.e., from the solution of curve 68 to that of curve 66 results in a solution which has a relative volume of the liquid phase of 100 percent at about the same temperature as does a solution with lower initial filling and lower concentration of uranium and phosphoric acid.

Curve 69, for a solution of 0.480 M U(VI) as $UO_3$ in 12.7 M $H_3PO_4$ at an initial filling of 60.3 percent, in comparison with curves 67 and 68, shows that the general effect of increasing the phosphoric acid concentration is to materially reduce the relative volume of the liquid phase at a given temperature and for a particular initial filling. Thus the expansion of the solution is also related to the phosphoric acid concentration. Such a relation enables a determination of the percentage of the volume of the reactor which contains liquid fuel to be made by remote temperature indicating devices.

Figure 6:
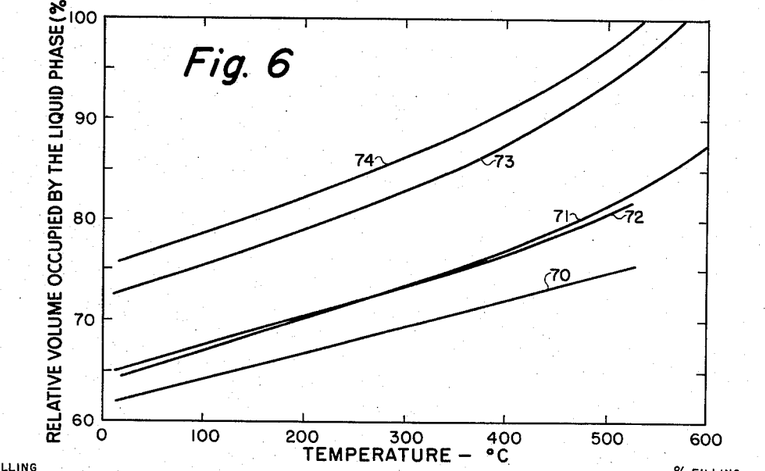
Figure 6 is a graph showing the temperature characteristics of the uranous phosphate liquid fuel solution.

Referring now to Figure 6, a series of curves is shown indicating the relation between temperature and the relative volume occupied by the liquid phase, in percent of the total volume for enriched uranium (IV) in the form of dissolved $UO_2$.

Curve 70, for a solution of 0.4 M U(IV) as $UO_2$ in 17.8 M $H_3PO_4$ with an initial filling of 62.2 percent shows that the uranous system as compared with the uranyl system exhibits the property that a higher phosphoric acid concentration materially reduces the expansion of the solution over the same temperature range.

Curve 71, for a solution of 0.40 M U(IV) as $UO_2$ in 14.1 M $H_3PO_4$ with an initial filling of 64.8 percent shows the same properties as curve 70 and has the same general curvature. However, in the case of curve 71 a hydrogen-oxygen recombination catalyst, copper, has been added in the form of 0.10 M Cu as $$Cu_3(PO_4)_2 \cdot 3H_2O$$

This would make it possible to operate at somewhat lower temperatures if required, since the recombination rate would be higher with the catalyst.

Curve 72, for a solution of 0.364 M U(IV) as $UO_2$ in 16.3 M $H_3PO_4$, with an initial filling of 65.4 percent, follows the same general curvature as 70 except that in the higher temperature ranges the expansion is relatively larger.

Curve 73, for a solution of 0.40 M U(IV) as $UO_2$ in 14.1 M $H_3PO_4$ with an initial filling of 73.1 percent, shows that in the temperature range up to 600° C. this initial filling percentage of about 73 percent is about minimum if the liquid is to occupy the entire volume.

Curve 74 is for the same solution as curve 71, only the initial filling percentages being different. It should be noted that curve 73, for a solution without a recombination catalyst, and curves 71 and 74 have the same general curvature, and that no adverse effect on the expansion of the liquid results from the use of such recombination catalysts.

A solution of 0.343 M U(IV) as $UO_2$ in 15.4 M $H_3PO_4$ with an initial filling of 78.1 percent has the same general properties as the solutions of curves 73 and 74.

Figure 7:
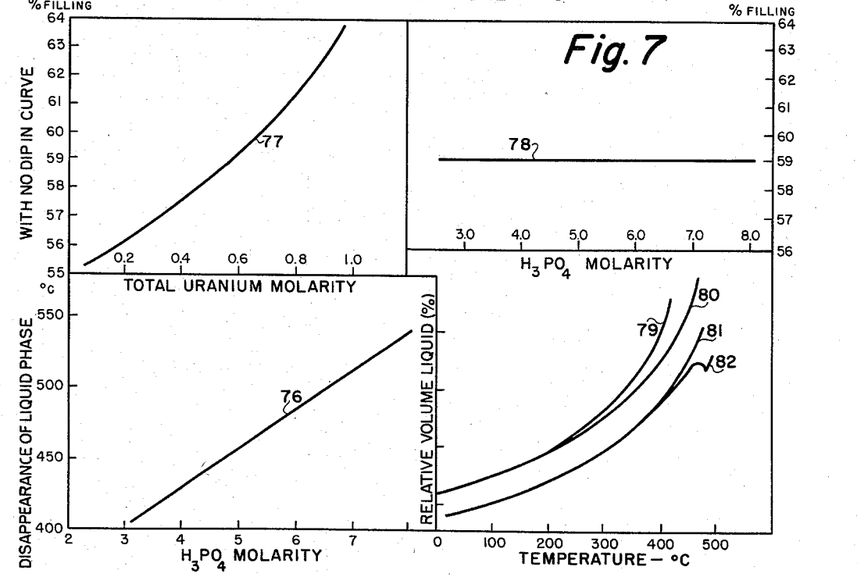
Figure 7 is a series of graphs showing additional properties of the uranyl phosphate liquid fuel solution.

Referring now to Figure 7, several graphs indicate additional properties of the uranyl system.

Specifically, curve 76 shows the relation between phosphoric acid molarity and the temperature at which the meniscus disappears, i.e., the phase critical point temperature. This curve is for a constant uranium molarity of 0.48. Thus the general increase in the phase critical point temperature with increasing phosphoric acid molarity is apparent.

Curve 77 shows the relation between total uranium molarity and the least percentage of filling required to avoid the maximum in the relative volume curve (compare curves 64 and 67) before the meniscus disappears. This curve is for a constant phosphoric acid molarity of 5.6. Points slightly above the curve give the phase critical phenomenon without a maximum in the curve. Thus, for a reactor wherein the phase critical phenomenon is not to be utilized, the combinations of uranium molarity and percentage filling which are considerably above the curve must be utilized. Further, it is apparent that a minimum filling of 55 percent of the total volume is required to avoid the phase critical phenomenon with a maximum even with no uranium.

Curve 78 is related to curve 77 in that in the solutions of curve 78 the uranium molarity is held constant and the effect on the minimum percentage filling to avoid the no-maximum phase critical phenomenon of variations in the phosphoric acid molarity are shown. The critical filling required for a constant uranium molarity of 0.48 is approximately 59 percent. Thus the phosphoric acid concentration does not appear to appreciably affect the existence of the phase critical point, although the temperature at which it takes place is affected. Similar curves for other uranium molarities can be worked out by skill of the art techniques.

The series of curves 79 through 82 depict the relationship between temperature and relative volume of the liquid phase in percent for two specific solutions with and without the use of an atmosphere of gas over the solution. Referring in particular to curves 79 and 80 for a solution of 0.462 M U(VI) as $UO_3$ in 5.61 M $H_3PO_4$ and of 0.45 M U(VI) as $UO_3$ in 5.56 M $H_3PO_4$, respectively, and an initial filling of about 62 percent, it is seen that the solution of curve 80 reaches a higher temperature at 100 percent liquid volume than does the solution of curve 79. This change does not result merely from the minor changes in concentration, but is a result of the utilization of a 200 p.s.i. overpressure of oxygen over the solution of curve 80. This overpressure of oxygen is used to help prevent corrosion to the reactor vessel and also functions to keep the uranium in the preferred valence state during the operation of the reactor, as is explained in more detail hereinafter.

As can be seen by comparing curves 81 and 82 this overpressure also increases the temperature at which the phase critical point phenomenon occurs, i.e., 479° C. for the solution of curve 81 and 491° C. for the solution of curve 82.

In the case of the uranous system, i.e., the tetravalent system, an overpressure of hydrogen is utilized which has the same general effect as oxygen does for the uranyl system, i.e., prevents corrosion and aids in maintaining the uranium in the proper valence state.

Figure 8:
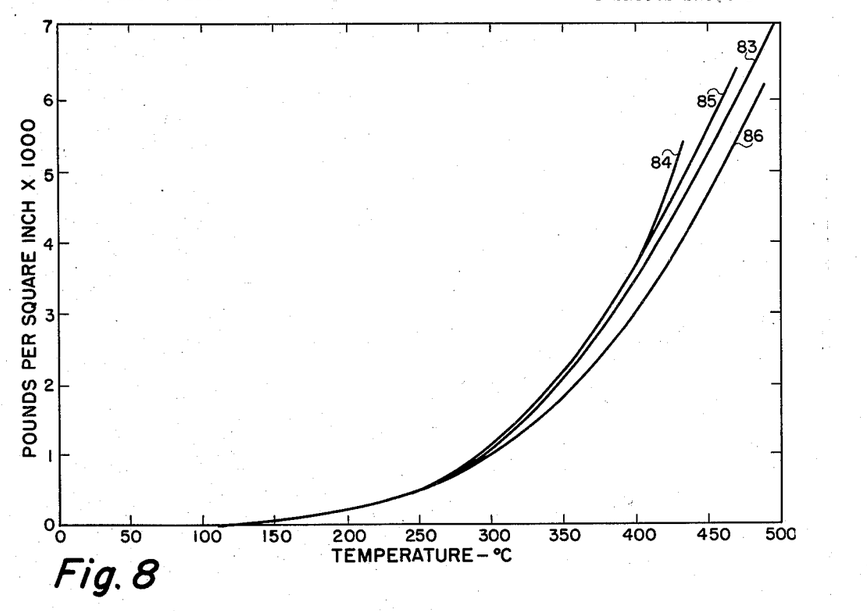
Figure 8 is a graph showing the dependency of vapor pressure on temperature for the uranyl phosphate system.

Figure 8 shows a series of curves for the uranyl system wherein the vapor pressure is plotted against temperature for various concentrations and percent initial fillings. Specifically, curve 83 is for a solution of 0.764 M U(VI) as $UO_3$ in 5.28 M $H_3PO_4$ and an initial filling of 51.6 percent; curve 84 is for a solution of 0.309 M U(VI) as $UO_3$ in 2.90 M $H_3PO_4$ with an initial filling of 58 percent; curve 85 is for a solution of 0.76 M U(VI) as $UO_3$ in 5.28 M $H_3PO_4$ with an initial filling of 58 percent; and curve 86 is for a solution of 0.75 M U(VI) as $UO_3$ in 7.50 M $H_3PO_4$ with an initial filling of 58 percent.

Comparing curves 83 and 85 it can be seen that for essentially the same solution the vapor pressure is related to the initial filling percentage. Comparing curves 84, 85, and 86, it is apparent that increases in the phosphoric acid concentration result in lower vapor pressures for a specific temperature. Thus the higher the phosphoric acid concentration the lower the internal reactor pressure.

Thus it is desirable to obtain as high a concentration of phosphoric acid as is possible. With the uranyl system it is progressively more difficult to keep the uranium in solution as the phosphoric acid concentration is increased. However, in the uranous system the opposite is true, i.e., it is at the lower concentrations of phosphoric acid that difficulty is encountered in keeping the uranium in solution.

Specifically it has been found that about 0.6 M U(VI) as $UO_3$ is soluble in from about 3 M $H_3PO_4$ up to approximately 7.5 M $H_3PO_4$. However, in the uranous system, U(IV), with uranium of about 0.4 molarity, the urainum is soluble from 99.9 percent effectively 100 percent, $H_3PO_4$, i.e., 18 M $H_3PO_4$, down to about 15 molar or 90 percent $H_3PO_4$. In the intermediate range of 7.5 to 15 M $H_3PO_4$ the properties of the solutions are similar except for the solubility of the particular valence state.

Figure 9:
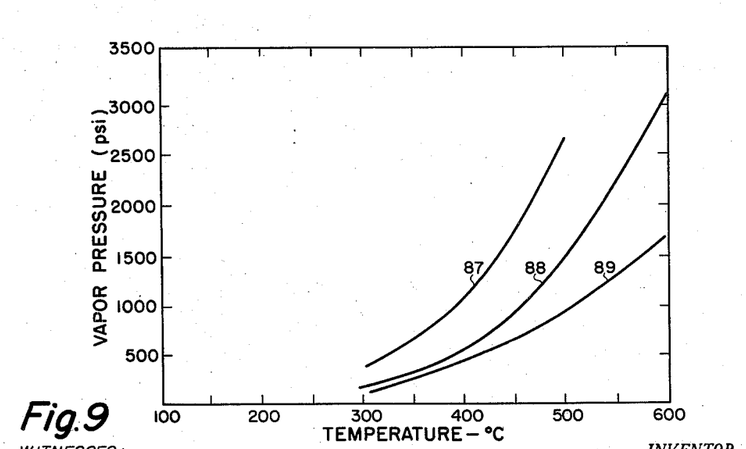
Figure 9 is a graph showing the dependency of vapor pressure on temperature for the uranous phosphate system.

The vapor pressure curves for the uranous system are shown in Figure 9. In this figure the vapor pressure is plotted as function of temperature for 0.5 M U(IV) in the form of $UO_2$ with an initial filling of 62 percent. Curve 87 represents the variations in vapor pressure for an 85 percent concentration of phosphoric acid, i.e., 14.0 M $H_3PO_4$. Curve 88 is for a 95.7 percent concentration or 16.7 M $H_3PO_4$, and curve 89 is for a 100.7 percent concentration or 18.3 M $H_3PO_4$. It is apparent from these three curves that increasing the phosphoric acid concentration lowers the vapor pressure at a given operating temperature.

Figure 10:
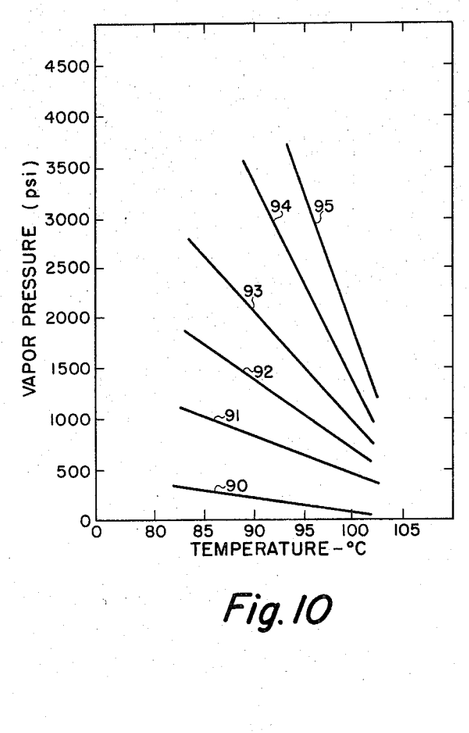
Figure 10 is a graph showing the variation in vapor pressure with per cent phosphoric acid at different temperatures for the uranous phosphate system.

The series of curves in Figure 10 are similar to those of Figure 7 except that the temperature is held constant for each curve and the concentration of phosphoric acid is varied.

Curves 90 through 95 are for solutions of 0.5 M U(IV) in the form $UO_2$ with initial fillings in all cases of 62 percent and for temperatures 300°, 400°, 450°, 500° and 600°, respectively. It is apparent from the series of curves that increasing phosphoric acid concentration has a greater effect in reducing the vapor pressure of the solution as the temperature is increased.

Figure 11:
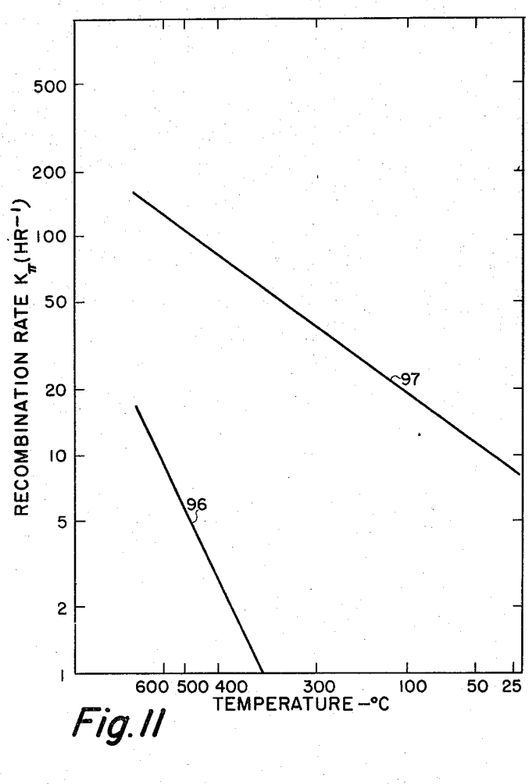
Figure 11 is a graph comparing the recombination rates as a function of temperature for the uranyl and uranous phosphate system.

As was pointed out hereinbefore, one of the outstanding advantages of the enriched uranium-phosphoric acid and water systems is that there is little net radiolytic gas production, when operated at high temperature, i.e., the gases are recombined without the necessity for conventional catalytic recombining apparatus. Figure 11 shows a plot of the recombination rate constants as $k\pi$ as a function of temperature for the uranyl and uranous system. The recombination rate constant is defined as the fractional recombination per hour. Curve 96 is for a solution of 0.5 M U(IV) in 2.9 M $H_3PO_4$ but curve 97 is for a solution of 0.5 M U(IV) in 95.7 percent or 16.7 M $H_3PO_4$. It can be seen that for the dilute solution, curve 96, the recombination rate is a rapidly varying function of temperature, while for the concentrated solution, curve 97, this variation is not as rapid. Furthermore, the dilute solution requires a minimum operating temperature of about 300° C. before the recombination rate is sufficient at one megawatt of power. However, in the concentrated phosphoric acid solutions the recombination rate is considerable, even as low as room temperature.

Figure 12:
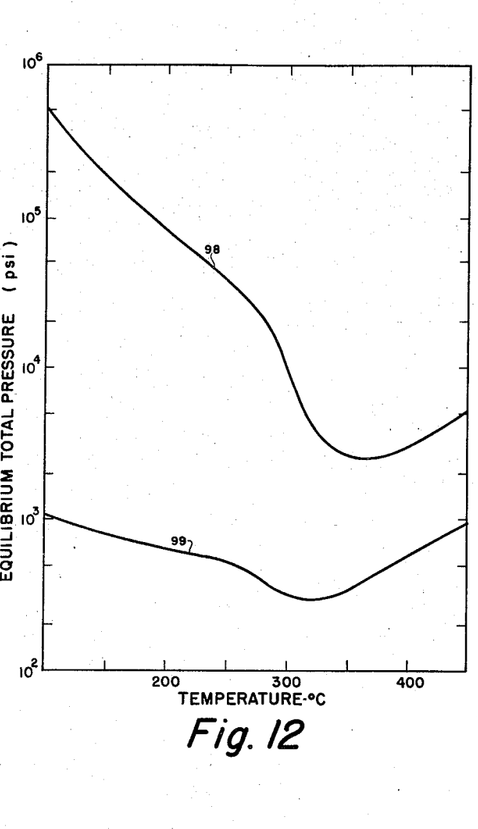
Figure 12 is a graph comparing the total pressure at equilibrium as a function of temperature for the uranyl and uranous phosphate system.

However, the recombination rate is dependent upon pressure, i.e., a certain equilibrium pressure must be reached before the recombination of gas is equal to the production. Figure 12 shows the variation of equilibrium total pressure with increasing temperature. Curve 98 shows the comparative variation in equilibrium pressure for the uranyl system, i.e., dilute phosphoric acid solutions, specifically 0.5 M U(VI) as $UO_3$ in 7.5 M $H_3PO_4$, and curve 99 shows this variation for the concentrated solutions, specifically 0.5 M U(IV) as $UO_2$ in 17.7 M $H_3O_4$, for a power level of one megawatt.

Figure 13:
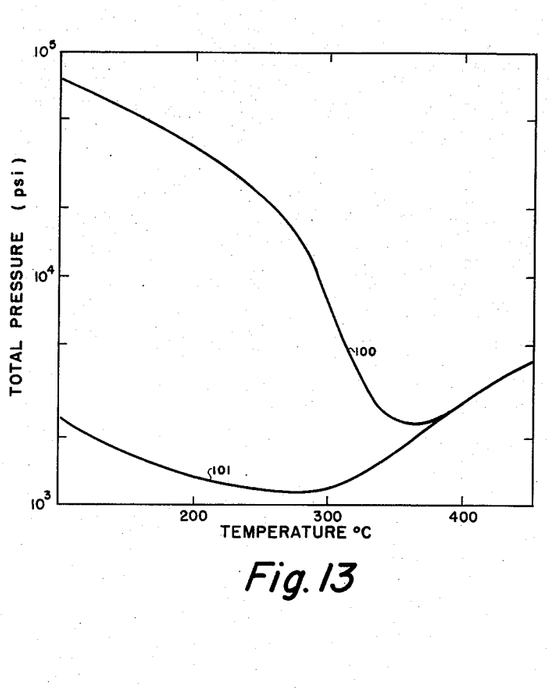
Figure 13 is a graph representative of the total pressures at given power levels.

Figure 13 shows the variation of total pressure in the reactor as a function of temperature for a solution of 0.5 M U(IV) as $UO_2$ in 7.5 M $H_3PO_4$ with 0.001 M Cu added. Curve 100 represents the total pressure at a power level of 1 megawatt while curve 101 is for a power level of 30 kw. It is apparent that at temperatures at or above 400° C. the total pressure in the reactor vessel for the two power levels is about the same. As evident from Figure 12, a graph for the uranous systems, i.e., $UO_2$ would have considerably lower total pressures. See co-pending application Serial No. 589,835, filed June 6, 1956, entitled Nuclear Reactor Fuel System, by Burton J. Thamer et al. for further explanation of the characteristics of the preferred liquid fuels.

Thus it is apparent that the liquid fuels utilized in the preferred embodiment of the reactor of the present invention have the following characteristics:

(1) The expansion of the solution is dependent upon the percentage of the total vessel volume which is initially filled with the solution.

(2) A certain minimum initial filling is required in order to obtain 100 percent of the volume to be occupied by the liquid phase.

(3) Certain concentrations and initial filling percentages exhibit a phase critical phenomenon.

(4) The general effect of increased initial filling is to reduce the temperature at which the entire volume is occupied by the liquid phase.

(5) Decreases in phosphoric acid concentration generally moves the point of 100 percent liquid volume to a lower temperature. The expansion of the solution is therefore related to the phosphoric acid concentration for a given temperature range, i.e., higher phosphoric acid concentration reduces the solution expansion.

(6) The presence of a recombination catalyst does not materially effect the properties of the solutions.

(7) Increasing the phosphoric acid concentration increases the temperature at which the phase critical point is exhibited.

(8) There is a minimum and maximum percentage initial filling between which the phase critical phenomenon will take place for any solution.

(9) The phase critical point is related to uranium molarity, phosphoric acid molarity and percent initial filling.

(10) The vapor pressure is related to the percent of initial filling and to the concentration of phosphoric acid. The higher the phosphoric acid concentration the lower the vapor pressure.

(11) The internal gas recombination rate for the U-(IV) system is materially greater than the U(VI) system.

Thus, the selection of a liquid fuel for a particular reactor will require the selection of the uranium concentration, the phosphoric acid concentration, the initial filling percentage, the desired operating vapor pressure, the operating temperature, the recombination rate, and whether it is desirable to operate in the phase critical region.

For example, if the phase critical phenomenon is not to be utilized and an operating temperature of 450° C. is desired the solution of curve 65 may be utilized. This particular solution requires an initial filling of 61.8 percent of the total volume to be occupied by the liquid fuel. The phase critical phenomenon is avoided since the initial filling is appreciably greater than 59 percent as indicated by curve 78 of Figure 7, and for a uranium molarity of 0.491 the initial filling is considerably above curve 77. The vapor pressure for this solution at 450° C. would be similar to curve 86 of Figure 8, and the recombination rate constant, see Figure 11, would be of the order of 5, with a total vapor pressure at one megawatt of about 5000 p.s.i. (see Figure 12). If a lower vapor pressure is desired, then the uranous, U(IV), system may be utilized which may require a higher phosphoric acid molarity.

Figure 14:
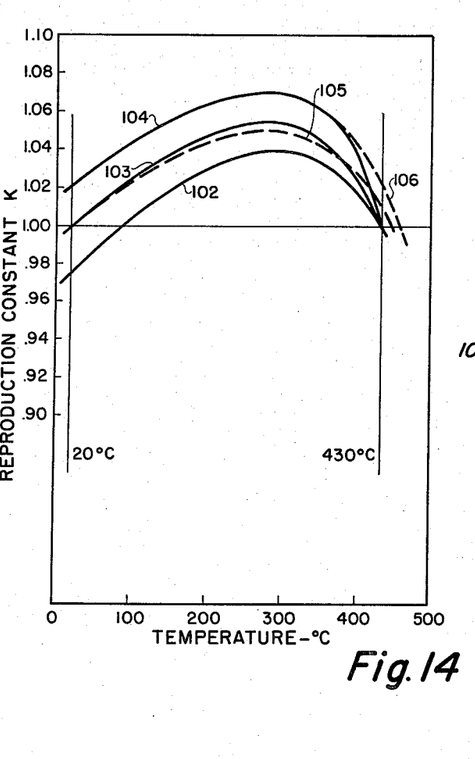
Figure 14 is a graph showing the dependency of the reproduction constant on reactor temperature for the reactor of Figure 2.

The effect on the reproduction factor $k$ on reactor temperature and initial filling is shown in Figure 14. Curves 102, 103, and 104 show respectively the temperature dependence, for solutions of 0.6 M U(IV) as in 5.6 M H$_3$PO$_4$ in a cylindrical critical region 15" diameter and 15" high, for initial fillings of 58, 59, and 60 percent, respectively. The dotted curve 105 is for 59 percent initial filling but shows the slight correction resulting from the expansion of the vessel. Curve 106 represents the increase in reactivity due to the baffle 45. It is thus apparent that the baffle has little effect on the reactivity. It is apparent from Figure 14 that at about 430° C. the reproduction constant is approximately 1.00. It should be noted that over the temperature range of from room temperature to about 300° C. for the cylindrical shaped vessel, there is a positive temperature coefficient of reactivity while beyond this point the coefficient becomes negative. Thus, a sufficient number of control rods should be present so that an equivalent of at least about .08 $k$ can be inserted in cases of emergency shutdowns. However, the positive temperature coefficient may be overcome by changing the vessel geometry in the critical region from cylindrical to a geometry wherein the walls are slightly concave inwardly so that there is a geometry compensation for the positive temperature coefficient of reactivity.

Critical region

The critical region lies between two noncritical regions, a vapor region above and a heat exchanger region below. Both of these latter regions, as well as the fuel reservoir below the heat exchanger region, are maintained subcritical by poison and poor geometry. The selected liquid fuel, at its elevated operating temperature, completely fills the reactor core region and makes it just critical. Thus only a portion of the critical region is filled initially with the cold fuel solution. The portion filled is determined by the percentage initial filling which in turn is dependent on various factors as described hereinbefore. For a particular filling, 59 percent for example, the liquid level would be in the lower portion of the critical region 21.

The quantity of fuel inserted in the initial filling is referred to herein as the cold critical volume, that is, when the liquid fuel level is in the lower portion of critical region 21 as shown by the numeral 125 in Fig. 1. Thus, when the cold critical volume of fuel is introduced into the reactor vessel the fuel reservoir 23 and heat exchanger region 22 are completely filled with liquid fuel while the critical region 21 is only partially filled. As the cold critical volume of fuel is heated by nuclear reaction, as explained hereinafter, the liquid fuel expands until the critical region 21 is completely filled, the fuel level being indicated by numeral 126 in Fig. 1. This increased volume of fuel is called the hot critical volume of fuel. The reactor, when containing the hot critical volume of fuel, is considered then to be "hot critical," a critical assembly having been created.

The critical region for the preferred embodiment of the present invention is a right circular cylinder having a 15" diameter and 16" height. The necessary conditions for criticality may be calculated by methods wellknown in the art with consideration being given to the particular factors described above in the section "Liquid fuel system."

Fuel handling system

Figure 15:
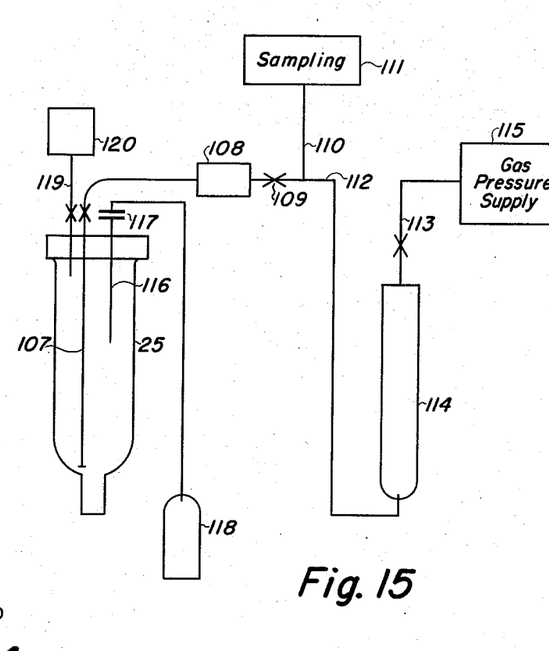
Figure 15 is a schematic diagram of the liquid fuel handling system.

The liquid fuel handling facilities are shown schematically in Figure 15. The vessel 25 has a solution transfer line 107 extending to the bottom of the fuel reservoir. Transfer line 107 is connected through a water cooling jacket 108 and a valve 109 to sampling line 110, which is connected to conventional sampling apparatus 111, and to pipe 112. The pipe 112 is connected to the bottom of metering, non-critical reservoir tank 114. The liquid level in the metering tank 114 indicates the level of the liquid fuel in the reactor vessel. The maximum solution removal rate, with the reactor at full pressure, is 6 liter/min. since transfer lines 107 and pipe 112 are ¼ I.D. pipe. This removal rate permits cooling of the soup by cooling jacket 108 from the fuel operating temperature of about 450° C. to less than 100° C. In this manner the corrosive effect on the apparatus beyond the cooling jacket 108 is materially reduced and there is no need for precious metal cladding or plating to protect the pipes, valves and other components.

Connected to the top of metering tank 114 is a pressure line 113 connected to a gas pressure supply 115. Pressure from supply 115 forces the liquid fuel into the reactor vessel 25.

An emergency dump line 116 is provided and extends into reactor vessel 25 to the level of the heat exchanger, i.e., below the level of the critical region. A rupture disk 117 is provided in line 116 which is set to release the solution when the vessel pressure reaches 7500 p.s.i. The release of rupture disk 117 permits the liquid fuel to flow out of the reactor to an emergency dump tank 118, which is of a non-critical geometry and is located in a shielded remote place. The air in the vessel is replaced with an over-pressure of the desired gas through gas tube 119 which is connected to a system 120 which includes a vacuum pump and a source of the desired gas.

All components of the liquid fuel handling facilities are chosen to provide an ever-safe geometry for the liquid fuel.

Safety circuits

The control rod and the safety rods are enriched boron rods which move inside the platinum-clad heavy walled stainless steel thimbles 44 and 49, respectively, as shown in Figure 2. The safety rods are about one-half inch in diameter and extend through the critical region only. The central or control rod is about 0.75 inch in diameter. The region of thimble 44 which lies below the heat exchanger serves as a container for part of the fuel reservoir poison. This poison, although removable, is not connected to that portion of the control rod which is movable into and out of the critical region.

The control rod mechanisms and safety circuits are similar to those of the prior art, see Principles of Nuclear Reactor Engineering, Samuel Glasstone, chapter VI (D. Van Nostrand & Co., 1955). In general, the control rods are moved in their vertical thimbles by two-phase, two-pole induction motors. The motors are controlled by level switches. The rods are attached to the withdrawing mechanism through D.-C. lifting magnets which are de-energized during a "scram" to allow the rods to fall freely into the reactor under the acceleration of gravity. Each rod hanger actuates a limit switch in the full-in and full-out position, this information being displayed on a control console.

Any leaks in the reactor vessel, abnormally high pressure in the steam line, power failure, excessive soup temperature, circulating pump leak, or failure of the feedwater pump, will automatically result in all safety and control rods being released.

The above-described components and circuits are wellknown in the art and are therefore not illustrated in the drawings.

Fuel circulation

The liquid fuel circulation cycle for the illustrated reactor is shown in Fig. 1. In general, the fuel is circulated by the impeller 56 upwardly into channel 121 extending between the walls of vessel 25 and the outer surface of funnel 51, through the heat exchanger region 22, the critical region 21, and onto the flow-directing surface of baffle 45 where the direction of flow is reversed, the fuel then flowing downwardly through channel 122 defined by funnel 51, where it is again agitated by impeller 56.

A significant contribution to the criticality of the reactor is made by the liquid fuel as it circulates through the diacritical diameter section 28 of the reactor vessel. The boron in poison reservoir 54 absorbs a portion of the emitted neutrons from the fuel circulating through the reduced diameter section 29 of the reactor vessel, thereby reducing the reproduction factor to a value below unity. In addition, the reduced diameter of section 29 also contributes to the reduction of the reproduction factor in that section.

At normal operating temperatures, about 450° C., for the illustrative example, there is no temperature differential between the liquid fuel in the fuel reservoir and the liquid fuel in the critical region. Thus, the liquid fuel may be circulated in a direction opposite to that shown in Figure 1, if this is desirable and the circulating pump is changed.

Circulation of the liquid fuel reduces the number of delayed neutrons which are emitted in the critical region. For a circulation rate which changes the solution in the critical region twice a second, the reactivity difference between delayed and prompt critical is approximately 51 percent as large as it is without circulation. Thus the reproduction constant is reduced approximately 0.4 percent by virtue of the removal of the delayed neutrons from the hot critical region by the circulating apparatus.

*Operation*

The start-up operation of the reactor of the present invention is as follows: The reactor vessel is evacuated by system 120 and the overpressure gas is admitted to the vessel, i.e., oxygen or hydrogen, so that at operating pressure the proper overpressure, i.e., 200 p.s.i. will be present. Valve 109 is opened. Gas pressure, 150 p.s.i. of oxygen, flows from source 115 through line 113 into reservoir 114 thereby forcing the liquid fuel through transfer line 107 into the reactor vessel at a rate of about one liter per minute. The amount of solution transferred to vessel 25 depends upon the percentage initial filling required for the particular liquid fuel and operating conditions. The amount required for any particular solution, i.e., the initial filling percentage, has been defined as the cold critical volume. During the liquid fuel addition at least some of the control rods and/or safety rods are in their out position so that shutdown can be effected if the counting rates are too high or if the reactor should suddenly go critical. For the particular liquid fuel being used, cold critical with the remaining rods in should be reached when the liquid fuel reaches a level about 8 inches above the heat exchanger. All valves to the reactor are closed.

As the remaining rods are removed the core region of the vessel becomes supercritical. The liquid fuel in the core will be heated by the nuclear reaction. The remainder of the liquid fuel will be heated to a uniform temperature by convection circulation. The control and safety rods in their out position extend into the vapor region to poison this region. However if the vaporized fuel in the vapor region is non-critical by geometry the rods may be removed from the vapor region. As the liquid fuel in the entire vessel heats it will expand to its hot critical volume, thereby filling the entire critical region. As the fuel level rises from its initial position 125, as shown in Fig. 1, which is the liquid level at the cold critical volume of fuel, to the level at the hot critical volume, shown as 126 in Fig. 1, the liquid forces vapor and gases present above the liquid upwardly through spaces in baffle 45 and around the edges of baffle 45 through which thimbles 49 pass, into the vapor region 20 above the baffle 45.

The circulating pump is then turned on and the water flow rate through the heat exchanger is increased until the desired power extraction rate is reached. The liquid fuel will be circulated up channel 121 around the heat exchanger 52 into the critical region and down channel 122. The specific reactor described at the prescribed operating temperature will develop about 2 megawatts of heat. The internal pressure will be less than about 5000 p.s.i.

Thus it is apparent that the reactor of the present invention has a novel arrangement and association of components which results in added safety and ease of control. The utilization of a fuel reservoir provides a volume of liquid fuel which when heated will expand into the critical region. Thus, it is possible with the reactor of the present invention to accomplish a complete shut-down of the reactor without requiring large control of reactivity, such as, numerous rods or removing liquid fuel from the reactor vessel. The solution will contract and upon cooling to room temperature the critical region is no longer filled with liquid fuel. In this manner there is never a possibility of a large excess reactivity if the circulating pump is not turned on until after the solution has heated to operating temperature.

Although a particular embodiment of the present invention has been described it is apparent that numerous modifications may be made without departing from its scope. Thus, if a research reactor of a moderately high neutron flux is required, the reactor described may be modified by omitting the circulating pump and relying on convection circulation for heat extraction purposes. Furthermore, other liquid fuels than the ones described may be used. The only requirement, as to liquid fuels to be used with the present invention, is that they have a negative temperature coefficient of reactivity, i.e., that they expand upon heating. Thus, other fuels having appropriate expansion coefficients and similar characteristics may be used in the present invention. Therefore, the reactor of the present invention is not limited to the specific embodiment disclosed but only by the appended claims.

What is claimed is:

A homogeneous nuclear power reactor comprising a vertical cylindrical sealed reactor vessel having an upper portion, an upper-intermediate portion, a lower-intermediate portion, and a lower portion, the upper end of said upper portion terminating in a removable manifold plate, a fuel flow-directing baffle supported in the uppermost part of said upper-intermediate portion, the lower surfaces of said flow-directing baffle being annular trough shaped to alter the direction of flow of liquid fuel impinging thereon, said flow-directing baffle having selectively spaced apertures therein to provide communication between the upper and upper-intermediate portions of said reactor vessel without substantially affecting the flow-directing characteristics of said baffle, heat exchanger means supported in said lower-intermediate portion, fuel circulation means supported at the bottom of said lower portion, said vessel containing a quantity of liquid fuel which during normal reactor operation at a predetermined operating temperature and pressure is sufficient to fill said lower, lower-intermediate, and upper-intermediate portions, said liquid fuel comprising an aqueous solution containing a sufficient concentration of a fissionable isotope to constitute a critical assembly when substantially filling the lower, lower-intermediate, and upper-intermediate portions of said vessel at said operating temperature whereby a critical region is established in said upper-intermediate portion, said critical region being bounded on the bottom by the top of said heat exchanger means, on the sides by the walls of said reactor vessel and on the top by said flow-directing baffle, substantially cylindrical means coaxially supported in the lower, lower-intermediate, and upper-intermediate portions of said vessel for directing forced circulation of said liquid fuel whereby when said fuel is agitated by said fuel circulation means the fuel is circulated upwardly along the outside of said cylindrical means, passing through said lower portion, around said heat exchanger means in said lower-intermediate portion, and up through said upper-intermediate portion where it impinges on said flow-directing baffle and is redirected downwardly through said cylindrical flow-directing means to said fuel circulation means at the bottom of said reactor vessel.

References Cited in the file of this patent

UNITED STATES PATENTS 2,820,753   Miller et al. _____________ Jan. 21, 1958

OTHER REFERENCES

U.S. Atomic Energy Commission, L. D. P. King, LA–1942, April 13, 1955, pages 4–17. Copy can be secured from Techanical Information Services, Oak Ridge, Tenn.

Proceedings of the International Conference on the Peaceful Use of Atomic Energy, vol. 3, pp. 175–187, 263–282, 283–286, August 1955, United Nations, N.Y.